US011968479B2

(12) United States Patent
Meier et al.

(10) Patent No.: US 11,968,479 B2
(45) Date of Patent: *Apr. 23, 2024

(54) METHOD OF TRACKING A MOBILE DEVICE AND METHOD OF GENERATING A GEOMETRICAL MODEL OF A REAL ENVIRONMENT USING A CAMERA OF A MOBILE DEVICE (71) Applicant: Apple Inc., Cupertino, CA (US)

(72) Inventors: Peter Meier, Los Gatos, CA (US); Sebastian Lieberknecht, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 75 days.

This patent is subject to a terminal disclaimer.

(21) Appl. No.: 17/663,533

(22) Filed: May 16, 2022

(65) Prior Publication Data

US 2022/0279147 A1 Sep. 1, 2022

Related U.S. Application Data (63) Continuation of application No. 16/749,262, filed on Jan. 22, 2020, now Pat. No. 11,336,867, which is a
(Continued)

(51) Int. Cl.
G06K 9/00 (2022.01)
G06T 7/246 (2017.01)
(Continued)

(52) U.S. Cl.
CPC ............ H04N 7/185 (2013.01); G06T 7/251 (2017.01); G06T 7/579 (2017.01); G06T 7/70 (2017.01);
(Continued)

(58) Field of Classification Search
CPC ........ H04N 1/00307; H04N 7/18; G06K 9/00; G09G 5/00
(Continued)

(56) References Cited

U.S. PATENT DOCUMENTS 8,874,162 B2 10/2014 Schrader
2010/0208057 A1* 8/2010 Meier ..................... G06T 15/00
345/173
(Continued)

FOREIGN PATENT DOCUMENTS

CN 101162524 A 4/2008
CN 102037317 A 4/2011
(Continued)

OTHER PUBLICATIONS

Diego Alberto Castro, et al., "Multi-robot SLAM on Client-Server Architecture," Brazilian Robotics Symposium and Latin American Robotics Symposium (SBR-LARS), IEEE, Oct. 16, 2012 (Oct. 16, 2012), pp. 196-201, XP032274890, DOI: 10.1109/SBR-LARS.2012. 39, ISBN: 978-1-4673-4650-4.

Primary Examiner — Seyed H Azarian
(74) Attorney, Agent, or Firm — Blank Rome LLP (57) ABSTRACT A method of tracking a mobile device comprising at least one camera in a real environment comprises the steps of receiving image information associated with at least one image captured by the at least one camera, generating a first geometrical model of at least part of the real environment based on environmental data or mobile system state data acquired in an acquisition process by at least one sensor of a mobile system, which is different from the mobile device, and performing a tracking process based on the image information associated with the at least one image and at least partially according to the first geometrical model, wherein the tracking process determines at least one parameter of a pose of the mobile device relative to the real
(Continued)

environment. The invention is also related to a method of generating a geometrical model of at least part of a real environment using image information from at least one camera of a mobile device.

17 Claims, 6 Drawing Sheets

Related U.S. Application Data continuation of application No. 16/180,457, filed on Nov. 5, 2018, now Pat. No. 10,582,166, which is a continuation of application No. 15/167,391, filed on May 27, 2016, now Pat. No. 10,121,247, which is a continuation-in-part of application No. PCT/EP2013/077483, filed on Dec. 19, 2013.

(51) Int. Cl.
  *G06T 7/579* (2017.01)
  *G06T 7/70* (2017.01)
  *G06T 17/10* (2006.01)
  *G09G 5/00* (2006.01)
  *H04N 7/18* (2006.01)

(52) U.S. Cl.
  CPC .... *G06T 17/10* (2013.01); *G06T 2207/10016* (2013.01); *G06T 2207/30244* (2013.01); *G06T 2207/30264* (2013.01)

(58) Field of Classification Search
  USPC ....... 382/100, 103, 106, 154, 155, 162, 168, 382/173, 181, 199, 206, 209, 214, 232, 382/254, 274, 276, 284–298, 305, 312; 345/633; 455/556.1; 348/135
  See application file for complete search history.

(56) References Cited

U.S. PATENT DOCUMENTS

| | | | |
|---|---|---|---|
| 2011/0319131 A1* | 12/2011 | An | G02B 7/08 455/556.1 |
| 2012/0176410 A1* | 7/2012 | Meier | G06T 15/20 345/633 |
| 2012/0237085 A1* | 9/2012 | Meier | G06V 10/768 382/103 |
| 2015/0248791 A1* | 9/2015 | Abovitz | G02B 27/4227 345/633 |

FOREIGN PATENT DOCUMENTS

| | | |
|---|---|---|
| CN | 102037483 A | 4/2011 |
| CN | 102192754 A | 9/2011 |
| CN | 102667855 A | 9/2012 |
| CN | 103119627 A | 5/2013 |
| EP | 1462762 A1 | 9/2004 |
| JP | 2005227912 A | 8/2005 |
| JP | 2008123028 A | 5/2008 |
| JP | 2012118909 A | 6/2012 |
| WO | 2013029675 A1 | 3/2013 |

\* cited by examiner

METHOD OF TRACKING A MOBILE DEVICE AND METHOD OF GENERATING A GEOMETRICAL MODEL OF A REAL ENVIRONMENT USING A CAMERA OF A MOBILE DEVICE

BACKGROUND

The present disclosure is related to a method of tracking a mobile device comprising at least one camera in a real environment, and to a method of generating a geometrical model of at least part of a real environment using image information from at least one camera of a mobile device comprising receiving image information associated with at least one image captured by the at least one camera.

Camera pose estimation and/or digital reconstruction of a real environment is a common and challenging task in many applications or fields, such as robotic navigation, 3D object reconstruction, augmented reality visualization, etc. As an example, it is known that systems and applications, such as augmented reality (AR) systems and applications, could enhance information of a real environment by providing a visualization of overlaying computer-generated virtual information with a view of the real environment. The virtual information can be any type of visually perceivable data such as objects, texts, drawings, videos, or their combination. The view of the real environment could be perceived as visual impressions by user's eyes and/or be acquired as one or more images captured by a camera held by a user or attached on a device held by a user.

A task of camera pose estimation is to compute a spatial relationship or a transformation between a camera and a reference object (or environment). Camera motion estimation is to compute a spatial relationship or a transformation between a camera at one position and the camera at another position. Camera motion is also known as camera pose which describes a pose of a camera at one position relative to the same camera at another position. Camera pose or motion estimation is also known as tracking a camera. The spatial relationship or transformation describes a translation, a rotation, or their combination in 3D space.

Vision based methods are known as robust and popular methods for computing a camera pose or motion. The vision based methods compute a pose (or motion) of a camera relative to an environment based on one or more images of the environment captured by the camera. Such vision based methods are relying on the captured images and require detectable visual features in the images.

Computer Vision (CV) based Simultaneous Localization and Mapping (SLAM) is a well-known technology for determining the position and/or orientation of a camera relative to a real environment and creating a geometrical model of the real environment without requiring any pre-knowledge of the environment. The creation of the geometrical model of the real environment is also called the reconstruction of the environment. Vision based SLAM could facilitate many applications, such as navigation of a robot system or a mobile system. Particularly, it is a promising technology that would support mobile Augmented Reality (AR) in an unknown real environment.

Most SLAM systems have to be initialized in order to get an initial part of the environment model. The initialization has to be done with a distinct movement of the camera between acquiring two images of the real environment. The distinct movement requires that the two images are captured from two distinct camera locations with a sufficient displacement compared to the distance to the environment. Note that rotation-only camera motion produces a degenerated result. It is one of major limitations for using a SLAM device in AR, particularly in hand-held or mobile AR where it is definitely not user-friendly to require a user to move the device a certain way in order to make the system work. Rotation-only camera movement is a natural motion for the users to look around in a real environment and often occurs in many AR applications. However, the rotation-only camera motion may produce a degenerated result for monocular SLAM.

Furthermore, a single camera does not measure metric scale. Another limitation for using monocular SLAM systems in AR is that recovered camera poses and the geometrical model of the environment are up to a scale as an undetermined factor. The undetermined scale factor introduces challenges to correctly overlay virtual visual information to the real environment in an image of the camera.

Nowadays, geometrical models of many cities or buildings are available from 3D reconstruction or from their blueprints. However, most of these models are not up to date due to a frequent development or change of city constructions. Particularly, parking lots usually do not have geometrical models or up-to-date models, as parked cars change from time to time.

Various monocular vision based SLAM systems have been developed for AR applications and particularly for mobile hand-held AR applications. Common challenges and limitations for their use include initialization of the SLAM systems and determination of metric scale factors. The initialization of the SLAM systems requires a distinct movement of the camera for acquiring two images of a real environment such that the two images are captured from two distinct camera locations with a sufficient displacement compared to the distance to the environment. The quality of camera pose estimation and any generated geometrical model definitely depends on the initialization.

Achieving a distinct movement of the camera for a qualified SLAM initialization is especially challenging in hand-held AR applications where users who hold the camera may not be aware of the importance of the camera movement and even have difficulties to realize the distinct movement. Therefore, it is desirable to simplify the initiation or even make it invisible to the users.

Furthermore, a single camera does not measure metric scale. The camera pose and reconstructed environmental model from monocular vision based SLAM is up to an undetermined scale factor. A correct scale factor defines the true camera pose and the size of the reconstructed environmental model as they are in the real world.

The first well-known monocular vision based SLAM system is developed by Davison et al.. They require a camera having sufficient displacement between acquiring images for each newly observed part of areal environment. For determining correct metric scale factors, they introduce additional calibration object with known geometrical dimension.

Lemaire et al propose to use a stereo camera system to solve the problem of requiring camera movements and determining scale factors. However, using a stereo camera is only a partial remedy, since the displacement between the two cameras has to be significant in relation to the distance to the environment in order to reliably compute depth of the environment. Thus, a hand-held stereo system would be unable to completely solve the problem, and the requirement of the user to provide additional distinct movement may be still indispensable.

Lieberknecht et al. integrate depth information into monocular vision based SLAM to allow a correctly scaled camera pose estimation by employing a RGB-D camera that provides depth information related to image pixels. It is possible to determine a scale factor from known depth information. However, a RGB-D camera device is not commonly available in a hand-held device, e.g. mobile phone or PDA, compared to a normal RGB camera. Further, common low-cost RGB-D cameras which should be candidates for integration into hand-held devices are typically based on infrared projection, such as the Kinect system from Microsoft or Xtion Pro from Asus. These systems are off-the-shelve commodity cheap consumer devices.

U.S. Pat. No. 8,150,142 B2 and U.S. Pat. No. 7,433,024 B2 describe detailed ways of a possible implementation of an RGB-D sensor. However, these systems have problems when used outdoors at daytime due to sunlight.

Gauglitz et al. develops a camera pose estimation and environment model generation system that could work for general camera motion and rotation-only camera motion. For rotation-only motion, their method creates a panoramic map of a real environment instead of a 3D geometrical model of the real environment.

SUMMARY

It is an object of the disclosure to provide a method of tracking a mobile device comprising at least one camera in a real environment, and a method of generating a geometrical model of at least part of a real environment using image information from at least one camera of a mobile device, in which challenges and limitations for use of SLAM methods, such as initialization, are reduced and the initiation is simplified to a user.

According to an aspect, there is provided a method of tracking a mobile device comprising at least one camera in a real environment, comprising receiving image information associated with at least one image captured by the at least one camera, generating a first geometrical model of at least part of the real environment based on environmental data or mobile system state data acquired in an acquisition process by at least one sensor of a mobile system, which is different from the mobile device, and performing a tracking process based on the image information associated with the at least one image and at least partially according to the first geometrical model, wherein the tracking process determines at least one parameter of a pose of the mobile device relative to the real environment.

According to another aspect, there is provided a method of generating a geometrical model of at least part of a real environment using image information from at least one camera of a mobile device, comprising receiving image information associated with at least one image captured by the at least one camera, generating a first geometrical model of at least part of the real environment based on environmental data or mobile system state data acquired in an acquisition process by at least one sensor of a mobile system, which is different from the mobile device, and generating a second geometrical model of at least part of the real environment based on the image information associated with the at least one image and at least partially according to the first geometrical model.

According to the invention, tracking a mobile device equipped with at least one camera in a real environment and/or generating a geometrical model of the environment using the at least one camera is performed by using image information associated with at least one image captured by the at least one camera. Tracking the mobile device or generating the second geometrical model is performed at least partially according to knowledge of a first geometrical model of the real environment or a part of the real environment. The first geometrical model is created based on environmental data acquired by at least one sensor of a mobile system. Particularly, the environmental data is acquired while the mobile system is driven in the environment.

The mobile device may be conveyed by the mobile system during the acquisition process or a part of the acquisition process for acquiring the environmental data. In this way, the acquisition process is at least partially performed while the mobile device is being conveyed by the mobile system. Tracking the mobile device or generating the second geometrical model may be performed within a certain period after the acquisition process or a part of the acquisition process of the environmental data. The certain period may be 2 hours, 12 hours, or 24 hours.

The mobile system is particularly a mobile machine that could transport one or more persons or cargo. The mobile system could be, such as, but not limited to, a bicycle, motorcycle, car, truck, forklift, air plane or helicopter. The mobile system may or may not have an engine.

Acquiring the environmental data that is used to create the first geometrical model can be started anytime or only when certain conditions are met, e.g. when the mobile system is close to a set destination known to a navigation system, when the speed of the mobile system is below a certain threshold, etc. The certain condition may also be one of several states of the mobile system, e.g. speed, odometry, the state of engine, breaking system, the position of gears, light, the state of aircraft escape seat (i.e. ejection seat), etc. The certain condition may also be one of several states of the mobile device, e.g. the mobile device being inside or outside of the mobile system, a distance of the mobile device to a destination, the sudden motion of the mobile device inconsistent with the mobile system motion (e.g. a sudden acceleration relative to the mobile system), etc.

According to an embodiment, at least part of the first geometrical model may be generated according to one or more images captured by the at least one camera.

According to an embodiment, generating the second geometrical model is performed within a set time period, preferably within 24 hours, after the acquisition process or a part of the acquisition process.

According to a further embodiment, generating the second geometrical model is further based on received image information associated with at least one further image captured by the at least one camera or further based on received depth information associated with the at least one image.

According to an embodiment, the second geometrical model is generated by extending the first geometrical model.

Preferably, the acquisition process is at least partially performed while the mobile system is moving and sensor data are acquired from the at least one sensor of the mobile system at different mobile system positions.

According to an embodiment, the environmental data is acquired according to a position of the mobile system and at least one set destination for the mobile system. For example the environmental data is acquired after the mobile system reaches the at least one destination, or the environmental data is acquired if the mobile system is within a distance to the at least one destination, or the environmental data is acquired according to the position of the mobile system, a speed of the mobile system, and the at least one destination.

According to an embodiment, the first geometrical model is generated further based on image information associated with at least one image captured by a further camera placed in the real environment which is different from the camera of the mobile device.

According to an embodiment, the at least one sensor of the mobile system comprises at least two mobile system cameras, with a known spatial relationship between the mobile system cameras, and a metric scale of the first geometrical model is determined according to the spatial relationship.

According to a further embodiment, generating the first geometrical model or a part of the first geometrical model is performed by a processing device of the mobile system, and the first geometrical model is transferred from the mobile system to the mobile device. For example the first geometrical model is transferred from the mobile system to the mobile device via a server computer or via a point to point communication between the mobile system and the mobile device or via a broadcast or multicast communication (e.g. the mobile system broadcasts data).

According to an embodiment, the environmental data is transferred from the mobile system to the mobile device, and generating the first geometrical model or a part of the first geometrical model is performed on the mobile device. For example, the environmental data is transferred from the mobile system to the mobile device via a server computer or via a point to point communication between the mobile system and the mobile device.

According to another embodiment, the environmental data is transferred from the mobile system to a server computer, and generating the first geometrical model or a part of the first geometrical model is performed on the server computer.

According to an embodiment, the first geometrical model has a correct metric scale which is determined from mobile system-mounted sensors, such as radar, range sensor and/or time of flight sensor, and/or accelerometer, and/or gyroscope, and/or GPS, and/or star tracker, and/or which is based on a state of the mobile system, such as a speed of the mobile system.

For example, one or more routes to a destination are provided, and the environmental data is acquired and/or the first geometrical model is generated according to one or more of the provided routes.

According to an embodiment, at least one of the first and second geometrical models at least describes depth information of the real environment.

Preferably, the mobile device is a device that is portable by a user, in particular a hand-held device, a mobile phone, a head worn glasses or helmet, a wearable device, or an implanted device.

In a preferred embodiment, the method is adapted to be used in a method for augmented reality and/or navigation applications running on the mobile device.

According to an embodiment, in the tracking process or for generating the second geometrical model, vision based tracking is performed. For example, the vision based tracking is vision based Simultaneous Localization and Mapping (SLAM). The vision based tracking may comprise feature extraction, feature description, feature matching, and pose determination. For instance, used features are at least one of or combinations of: intensities, gradients, edges, lines, segments, corners, descriptive features, primitives, histograms, polarities and orientations.

The invention thus describes a method that supports vision based tracking or environment reconstruction. The disclosed method may also remove the requirement of the distinct camera movement to initialize monocular SLAM, as described above.

According to another aspect, the invention is also related to a computer program product comprising software code sections which are adapted to perform a method according to the invention. Particularly, the software code sections are contained on a computer readable medium which are non-transitory. The software code sections may be loaded into a memory of one or more processing devices as described herein. Any used processing devices may communicate via a communication network, e.g. via a server computer or a point to point communication, as described herein.

DESCRIPTION OF THE DRAWINGS

Aspects and embodiments of the invention will now be described with respect to the drawings, in which.

DETAILED DESCRIPTION

Although various embodiments are described in the following with reference to certain components, any other configuration of components, as described herein or evident to the skilled person, can also be used when implementing any of these embodiments.

In the following, embodiments and exemplary scenarios are described, which shall not be construed as limiting the invention.

Augmented Reality:

Augmented reality systems could present enhanced information of real environment by computer-generated information. The real environment may be enhanced by providing computer-generated audio information. One example is to navigate visually impaired humans in a real environment by computer-generated oral instructions based on using GPS data or other tracking technology. The computer-generated information may also be haptic feedback, e.g. vibration of a mobile phone. In the navigation application, an AR system may generate a vibration to warn a user in case the user goes a wrong way.

The most recognized augmented reality is to enhance the real environment visually by providing a visualization of overlaying computer-generated virtual visual information with visual impressions or an image of the real environment. The virtual visual information can be any type of visually perceivable data such as objects, texts, drawings, videos, or their combination. The real environment could be captured as visual impressions by user's eyes or acquired as one or more images by a camera worn by a user or attached on a device held by a user. The virtual visual information is superimposed or overlaid with the real environment or a part of the real environment in the camera image or visual impression at a right time, at a right place and in a right way in order to offer a satisfied visual perception to users.

The overlaid information of the virtual visual information and the real environment can be seen by users, e.g., in a well-known optical see-through display having semi-transparent glasses. The user then sees through the semi-transparent glasses objects of the real environment augmented with the virtual visual information blended in the glasses. The overlay of the virtual information and the real environment can also be seen by the users in a well-known video see-though display having a camera and a normal display device, such as a display screen. The real environment is captured by the camera and the overlay of the virtual data and the real environment is shown in the display to the users.

The virtual visual information should be superimposed with the real environment at desired pixel positions within the image or within visual impression, for example in a perspectively correct way, i.e. adapted and derived from the real environment being viewed. In order to achieve this, the pose of the camera or of the user's eye, i.e. orientation and position, with respect to the real environment or a part of the real environment has to be known. Furthermore, the virtual visual information is preferred to be superimposed with the real environment to achieve a visually correct occlusion perception or depth perception between the virtual visual information and the real environment. For this, a geometrical model or a depth map of the real environment is often required.

Monocular vision (i.e. based on a single camera) based SLAM is a promising technology to generate camera pose and create a geometrical environment model for AR applications. Monocular SLAM is particularly beneficial for mobile AR applications running on a hand-held device equipped with a single camera, as the camera image that captures the real environmental can always be a means for camera pose estimation and environment model generation. For the optical see-through display case, the pose of the user's eye could be determined from the camera pose when the camera has a fixed relation to the eye.

One Exemplary Scenario of the Present Invention:

Nowadays, people often drive a car to a destination, like in an unknown city, with guidance provided from a navigation system. The navigation system may have a navigation software running on a mobile computing device or an embedded system of the car. The navigation system (or software) may compute one or more routes to the destination. However, it is often impossible to find a parking place at or near to the destination. Thus, people have to park the car at another place different from the route's final destination and switch to other means of transport (e.g. by walking) in order to reach the final destination. The people may have difficulties or spend additional effort in a strange environment to find a path to the destination from the place where the car is parked. For this situation, the present invention proposes to run navigation on a hand-held device equipped with a camera based on a geometrical model of the environment that is created based on environmental data acquired by sensors of the car.

Normally, the people may drive the car and arrive at the destination where they may not find a parking place, and thus they will likely continue to drive until they find a free parking place. Then, the people would come back to the destination from where the car is parked. It is possible to start an acquisition process for acquiring environmental data (e.g., images, GPS data, etc.) after or when the car arrived at the destination and stop the acquisition process when the car is parked (e.g., engine is off). Then, a digital geometrical model of a real environment between the destination and where the car actually parked could be created based on the acquired environmental data. This geometrical model could be used to guide people to the destination together with the hand-held device equipped with the camera.

As a further scenario, a user parks his car in a real environment and then may run a navigation or augmented reality (AR) application on his hand-held device equipped with a camera. Navigation and AR applications may require known pose of the device relative to the environment. For this, a geometrical model of the environment may be used for determining the pose of the device, as described herein before.

A camera attached to a mobile device is an appropriate sensor for tracking the device and reconstructing a geometrical model of the environment. Vision based tracking commonly requires a known geometrical model of the environment and pose estimation can be based on correspondences between the geometrical model and a camera image. Monocular vision based SLAM could perform tracking of a camera in a real environment and generating the geometrical model of the environment simultaneously without having a geometrical model of the environment in advance. However, the monocular SLAM has to be initialized by moving the camera with a distinct displacement to order to create an initial model of the environment.

It is challenging to initialize the monocular SLAM manually from scratch, as it is not intuitive for a user to move the camera of the hand-held device with a sufficient displacement. The user has to initialize a monocular SLAM manually. Specifically the scale and image based tracking or reconstruction may be problematic.

Figure 4:
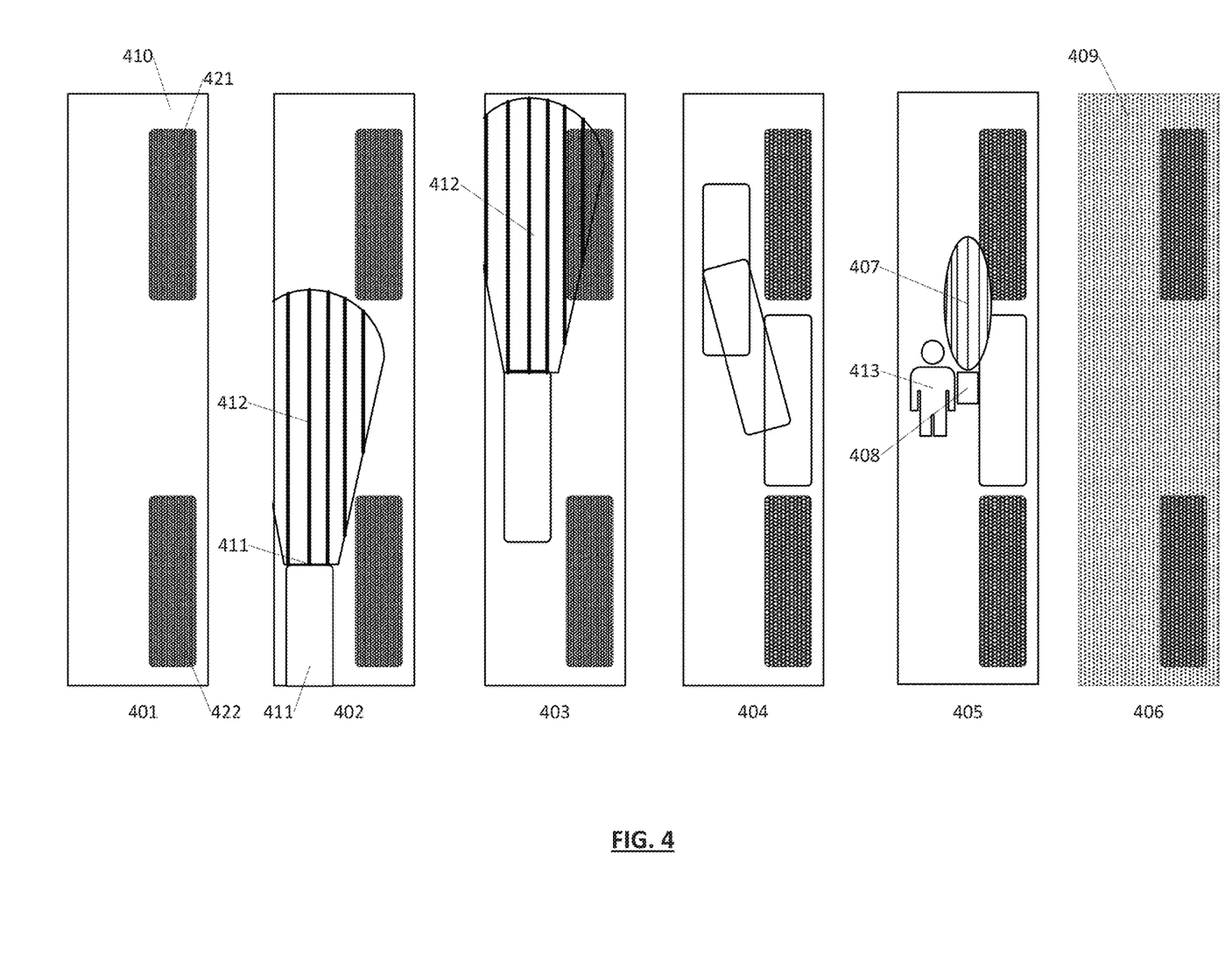
FIG. 4 shows an exemplary application scenario according to an embodiment of the invention when parking a mobile system.

Coming back to the above described exemplary scenario, and referring now to FIG. 4, assumed there are two cars 421 and 422 parked in a parking lot (see FIG. 4, depiction 401). According to an embodiment of the present invention, a geometrical model 409 of a real environment 410 is generated from image(s) of a mobile system camera 414 of car 411, while the car is being driven to search for a parking space in environment 410 (see FIG. 4, depictions 402, 403, and 404). 412 indicates the field of view of mobile system camera 414. The range of the generated geometrical model 409 is schematically represented by dots in depiction 406. After parking, the geometrical model 409 of the environment is available at the mobile device 408 equipped with a camera of passenger 413 of the car. 407 shows the field of view of the camera attached to the mobile device 408. Then, the passenger can use the geometrical model 409 or a part of model 409 and images captured by the camera of the mobile device 408 in order to track the mobile device 408 in the real environment, create another geometrical model of the real environment, and/or extend the geometrical model 409.

Figure 3:
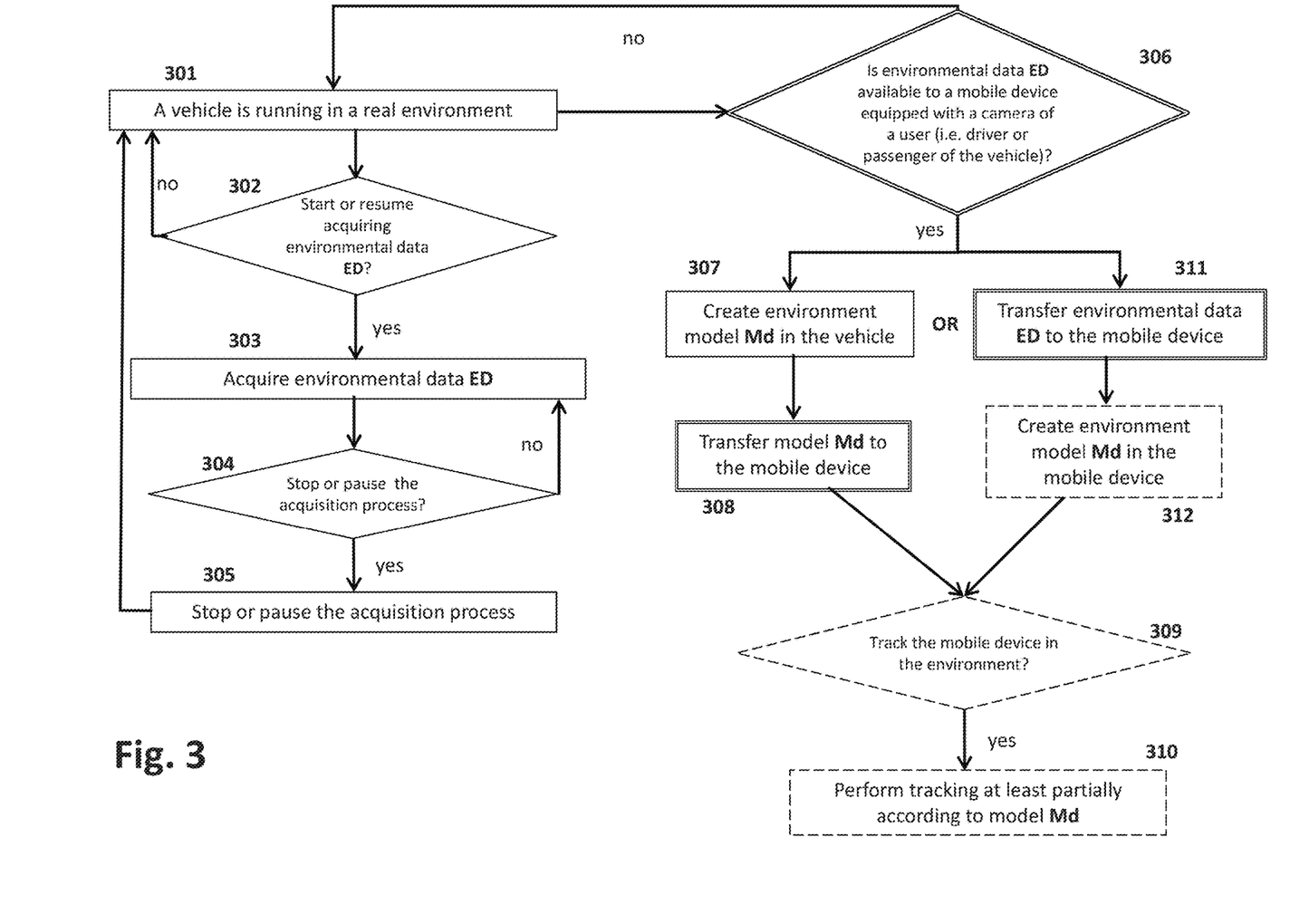
FIG. 3 shows a flowchart of a method according to an embodiment of the invention generating a geometrical model of the environment based on environment data acquired by sensors of a mobile system and tracking a device based on the generated environment model.

FIG. 3 shows a flowchart of a method according to an embodiment of the invention generating a geometrical model of the real environment based on environmental data acquired by sensors of a mobile system and tracking a mobile device based on the generated environment model. Assumed that a mobile system is running in a real environment (FIG. 3, step 301). In FIG. 3, a box with one solid outline indicates that action may be performed in the mobile system. A box with one dash outline indicates that action may be performed in the mobile device. A box with a double solid outline indicates that action may be performed in the mobile system, the mobile device, or both.

Environmental data ED could be acquired by one or more sensors mounted on the mobile system during driving the mobile system in or through the environment. The acquisition process of the environmental data ED could be manually started, resumed, paused, and/or stopped by a user. The acquisition process could also be started, resumed, paused, and/or stopped automatically when certain conditions are met (step 302), e.g. when the mobile system is close to a set destination known to a navigation system, or when the speed of the mobile system is below a certain threshold, etc. The certain condition may also be one of several states of the mobile system, e.g. speed, odometry, the state of engine, breaking system, the position of gears, light, distance of another object to the front or rear of the car, open/close state of the driver's door, steering wheel lock, hand brake, open/close state of the trunk, the state of aircraft escape seat (i.e. ejection seat), aircraft cabin pressure, or a combination of the above. The certain condition may also be one of several states of the mobile device 408, e.g. the mobile device being inside or outside of the mobile system, the distance of the mobile device to the destination, the sudden motion of the mobile device inconsistent with the mobile system motion (e.g. a sudden acceleration relative to the mobile system), etc.

When one or more conditions of starting or resuming the acquisition of the environmental data are met, or when users manually trigger the starting or resuming, the acquisition of environmental data ED is started or resumed (step 303). Then, if the acquisition of environmental data ED has to be stopped or paused (step 304), which is triggered either automatically or manually, then stop or pause the acquisition process (step 305). These steps are executed in the mobile system.

If environmental data ED is available to a hand-held device equipped with a camera of a user (e.g., driver or passenger of the mobile system), then either a geometrical model Md of the environment is generated based on environmental data ED by any processor device (not shown in the Figures) of the mobile system (step 307) and then the model is transferred to the hand-held device (step 308), or environmental data ED is transferred to the hand-held device (step 311) and then an environment model Md is generated based on the environmental data ED in the hand-held device (step 312).

It is also possible to transfer environmental data ED to another computer, e.g. a server computer remote from the mobile device and mobile system, and create a geometrical model Md of the environment based on the environmental data ED on such server computer, e.g. by an application running on the server computer. In such configuration, the server computer is communicating in a client-server architecture with the mobile device and mobile system as client devices. Then, the environmental data ED and/or the geometrical model Md is transferred from the server computer to the mobile device.

The geometrical model Md may be performed anytime whenever the environmental data or part of the environmental data is available, e.g. online during the acquisition process of the environmental data, or offline after the acquisition of the environmental data. For example, whenever new environmental data is available, the new environmental data are integrated for generating geometrical model Md.

Assuming that geometrical model Md is available in the hand-held device, if the hand-held device has to be tracked in the environment (step 309), tracking is performed at least partially according to the geometrical model Md (step 310). Steps 309 and 310 may be performed in the hand-held device.

One or more routes to a destination may be provided or computed. The routes may further be updated according to a current position of the mobile system or the hand-held device. The destination may be given manually by a user or defined in a navigation system. The acquisition of environmental data ED and/or the creation of geometrical model MD may be according to the routes. For example, only at places the user is likely to come by on the routes, relevant parts of the environmental data ED are acquired and/or relevant parts of geometrical model MD are created.

A Geometrical Model of the Environment Using Data from Sensors of a Mobile System:

For example, a geometrical model of a real environment may be generated by depth data of the environment provided by depth sensors of a mobile system, for example from range sensors or time of flight cameras mounted in the mobile system, while driving the mobile system in the environment. Many methods could be employed for reconstructing a 3D surface of the real environment from depth data. Push broom scanners may be used to create a 3D surface A geometrical model of a real environment (also referred to herein as environment model) may be created or generated while driving a mobile system (e.g., a car) in the environment and by employing vision based SLAM and at least one camera mounted in the car. Various vision based SLAM methods have been developed and could be employed for creating the environment model using images captured by the at least one camera of the mobile system. The other sensors of the mobile system could also be employed to support the construction of the environment model.

The created geometrical model of the environment from monocular vision based SLAM is up to an undetermined scale factor.

A correct scale factor needed for bringing the environment model to metric scale can be effectively determined by capturing an image of two points that have a known distance between them or a real object with a known physical size in the environment using a camera mounted in the mobile system. For example, traffic-lights, cars having known 3D models or other road equipment (white line distances, "piles" at side of road) may be employed in order to estimate the scale factor.

The correct scale factor could also be recovered from a distance between the mobile system and the environment. The distance may be measured from mobile system-mounted sensors, such as radar, range sensor, or time of flight camera, and can also be used for determining the scale factor. The correct scale factor may also be determined if a reference distance is known between one (or two) camera(s) capturing two images. The reference distance can be obtained, e.g., from the metric odometry using the rotational speed of the wheels or GPS coordinates. In case of a stereo camera, the baseline distance between the two camera centers can be used as reference distance.

The correct scale factor may also be determined if a position of the mobile system in the environment is known. The position of the mobile system in the environment may be determined from GPS or from a sensor fixed in the environment, like a security camera.

Figure 1:
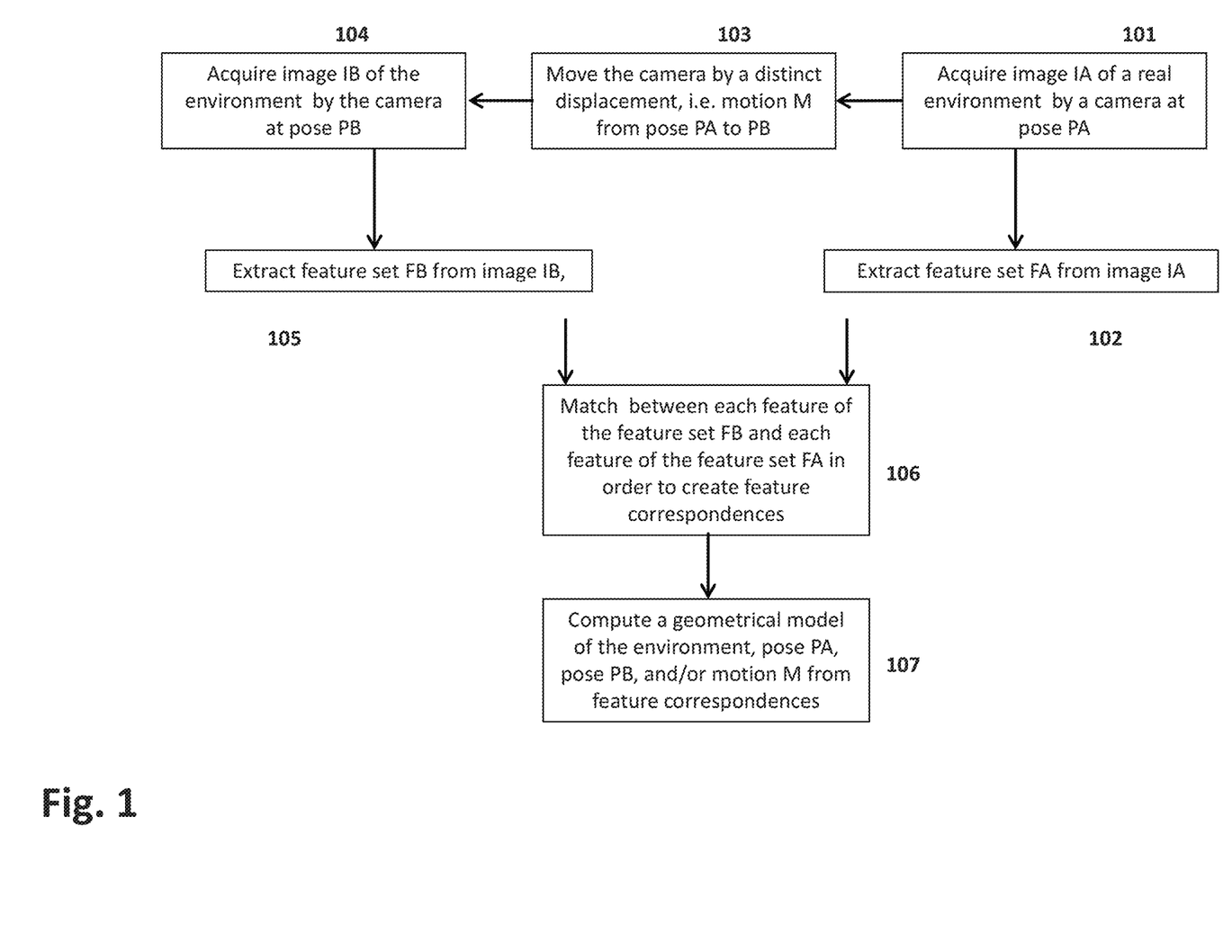
FIG. 1 shows a flowchart of a method according to an embodiment of the invention using SLAM.

Referring now to FIG. 1, given at least one camera, a process of creating or generating a geometrical model and/or computing camera poses based on images captured by the at least one camera may consist of feature detection (step 102 or 105), feature description (step 102 or 105), feature matching (step 106), triangulation (step 107) and optionally (global) map refinement which adjusts triangulation positions and/or camera poses, and/or removes and/or adds points from the triangulation.

The process of creating a geometrical model and/or computing camera poses may also be implemented based on using a stereo camera system.

Optical flow from a camera may also be employed to generate the geometrical model or support the generation of the model.

In order to reconstruct the environment model, at least two images may have to be captured by the camera at different positions. For example, image IA is captured in step 101 by the camera at pose PA, and then the camera is moved with a distinct displacement M to capture image IB at a pose in position different from pose PB (steps 103 and 104).

Feature detection may be performed for identifying features in images IA and IB by means of a method that has a high repeatability. In other words, the probability is high that the method will choose the part in an image corresponding to the same physical 3D surface as a feature for different viewpoints, different rotations and/or illumination settings (e.g. local feature descriptors as SIFT, shape descriptors, or other approaches known to the skilled person). Features are usually extracted in scale space, i.e. at different scales. Therefore, each feature has a repeatable scale in addition to its two-dimensional position. In addition, a repeatable orientation (rotation) is computed from the intensities of the pixels in a region around the feature, e.g. as the dominant direction of intensity gradients.

Feature description is the transformation of the detected image region into a typical feature descriptor that is robust or invariant to certain types of variations (e.g. (non-uniform) lighting, rotation and occlusion). A feature descriptor is determined in order to enable the comparison and matching of features. Common approaches use the computed scale and orientation of the feature to transform the coordinates of the feature descriptor, which provides invariance to rotation and scale. For instance, the descriptor may be an n-dimensional real-numbered vector, which is constructed by concatenating histograms of functions of local image intensities, such as gradients. Alternatively, a descriptor might be an n-dimensional binary vector.

Furthermore, each detected feature may be (optionally) associated with a (partial) position and orientation that is with respect to the environment and/or with respect to one of previous poses of the camera. The (partial) position may be obtained from GPS sensor/receiver, IR or RFID triangulation, or by means of localization methods using a broadband or wireless infrastructure. The (partial) orientation may be obtained from such as compass, an accelerometer, a gyroscope, or a gravity sensor. As the camera is mounted in the mobile system, the (partial) position and orientation with respect to one of previous poses of the camera may be obtained from the speed or steering of the mobile system.

Figure 2:
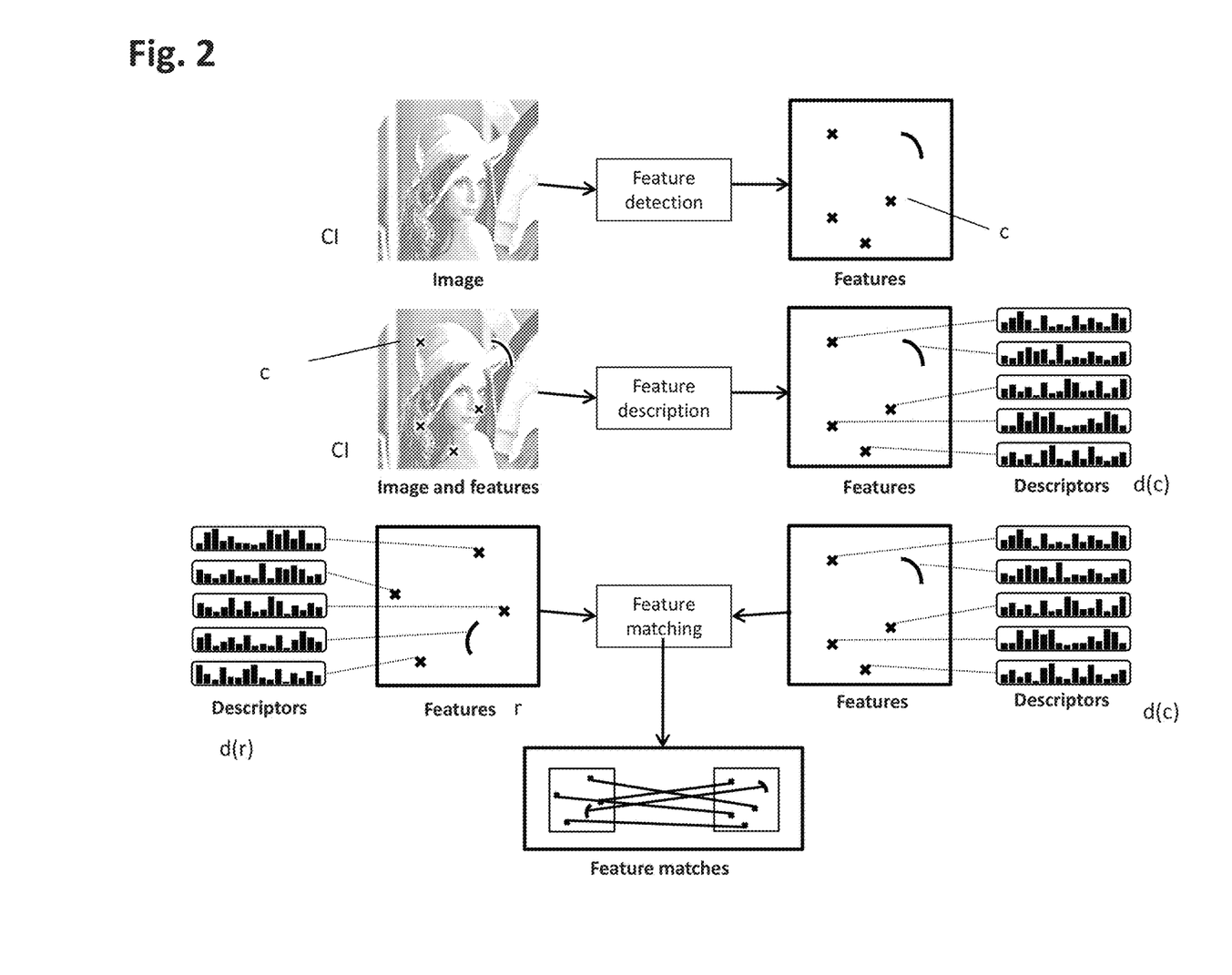
FIG. 2 shows an exemplary embodiment of detection, description and matching of features which may be used in a tracking or reconstruction method.

A plurality of features could be detected in one image. Feature matching is to find for every feature of one feature set a feature of another feature set with the most similar descriptor and store the two features as a correspondence (match). For example, given two feature sets FA and FB detected in and described from images IA and IB, the goal is to find, for every feature of feature set FA, one feature of feature set FB with the most similar descriptor. In this regard, it is referred to FIG. 2 showing images CI with features c and respective descriptors d(c) of the features c and descriptors d(r) of reference features r.

Matching feature set FA with the feature set FB could be done by determining a respective similarity measure between each respective feature descriptor in feature set FA and each respective feature descriptor in feature set FB. Common examples of image similarity measures include the negative or inverted sum-of-squared differences (SSD), negative or inverted sum of absolute differences (SAD), (normalized) cross-correlation, and mutual information. The result of a similarity is a real number. The bigger the similarity measure result is, the more similar the two visual features are.

The simplest approach to feature matching is to find the nearest neighbor of the current feature's descriptor by means of exhaustive search and choose the corresponding reference feature as match. More advanced approaches employ spatial data structures in the descriptor domain to speed up matching. Common approaches use approximate nearest neighbor search instead, e.g. enabled by space partitioning data structures such as kd-trees.

After feature matching, correspondences between features from feature set FA and feature set FB are created. The correspondences could be 2D-2D or 2D-3D. Based on the correspondences, a camera pose relative to the environment or to the one of previous camera poses is determined. After this, it is common, but optional, to have a (global) refinement step that possibly re-evaluates correspondences that were discarded during the initial phase. There are multiple methods and heuristics for the refinement.

Features may not have associated feature descriptors (e.g. SIFT), but may be represented by image patches. The comparison and matching of features may be performed by computing differences (e.g. pixel intensity differences) between image patches using methods such as the sum of squared differences (SSD), normalized cross correlation (NCC), sum of absolute difference (SAD), mutual information (MI).

During the following triangulation, the geometrical model (3D points) of the real environment and camera poses are computed from feature correspondences.

Figure 6:
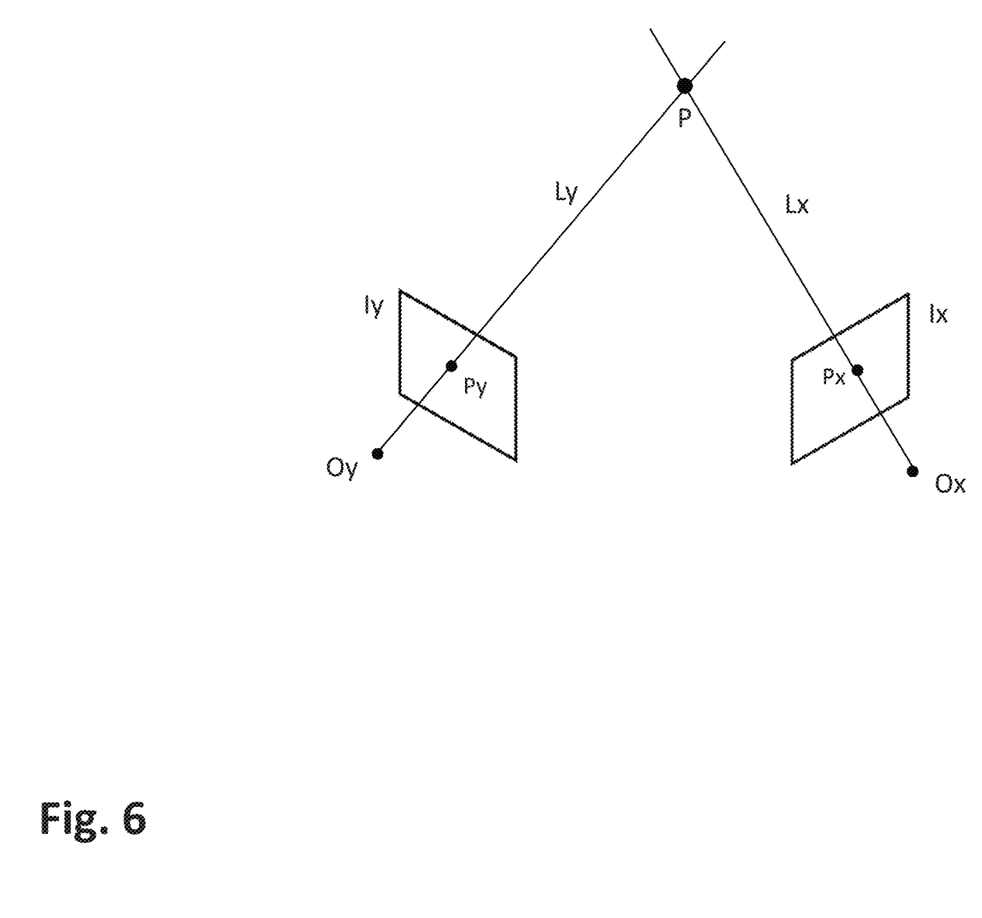
FIG. 6 shows a standard concept of triangulation.

Triangulation refers to the process of determining the position of a feature in 3D space given its projections (image features) onto two, or more, images. Referring to FIG. 6, for example, a 3D point P is projected as image point Px and Py onto two camera images Ix and Iy through lines Lx and Ly which intersect with each camera's focal point, O1 and O2 (see FIG. 6). Therefore, having known focal points O1 and O2 and detected feature correspondences Px and Py for the two camera images, lines Lx and Ly can be computed and the 3D position of point P can be determined by the intersection of Lx and Ly.

The creation of the model may register the images by using their intensity or color values directly, i.e. without using abstractions such as point, line or blob features. Dense reconstruction methods may construct a cost volume where a number of different hypothesis for each pixel are tested exhaustively. They may also be based on a prior sparse reconstruction. Dense methods are typically computationally expensive and employ a GPU to run in real time.

In the mobile system based scenario, images from multiple cameras may be available. A common setup comprises four mobile system cameras, where the cameras are aligned facing away from the mobile system to the left, right, front and rear. The mobile system cameras can be referenced to each other in terms of rotation and translation. Bundle adjustment could be used for refining a reconstructed model of the environment based on images taken by the multiple mobile system cameras, particularly for the multiple cameras having known spatial relationship.

For generating the geometrical model of the environment, the camera(s) mounted on the mobile system may be calibrated or non-calibrated. Camera calibration computes non-linear and linear coefficients that map a real-world object with known appearance, geometry and pose (relative to the camera) onto the image sensor. Calibration procedure is often performed to calibrate camera(s) before using the camera(s) for 3D reconstruction. It is also possible to perform 3D reconstruction simultaneously using non-calibrated camera images. It is also possible to change the parameters of the camera (e.g., by zooming or focusing) during acquisition of images for 3D reconstruction.

Superior Geometrical Model Quality from Mobile System-Based Reconstruction

In most cases, a geometrical model of an unknown environment created based on environmental data captured by sensors of a mobile system should be superior to a model created from a hand-held mobile device in terms of accuracy and consistency. This is because there are more sensors in the mobile system that can be used to cross-check the (intermediate) results of the reconstruction process. For example, correspondences can be validated via the overlap between two camera images from the same time or via predictions of object positions from the odometry; specifically, the steering angle of the front wheels and the speed of the mobile system can be used to predict how the image of a certain real object may have moved from one to the other camera frame (camera image), where the prediction is dependent on the depth of the real object relative to the camera.

Further, the motion of the car is more constrained than the motion of a hand-held device. It can be approximated well with less than six degrees of freedom (i.e. three degrees of freedom for translation and three degrees of freedom for rotation) and constraint motion due to much bigger mass and thus stronger inertia (compared to a mobile hand-held device). As the mobile system normally moves on a 2D ground plane and does not "jump" or "roll", two degrees of freedom are normally sufficient to model the translational motion, and one degree of freedom is sufficient to model the rotational motion. Of course, the motion of the mobile system can always be modeled by the complete six degrees of freedom, if necessary.

Vision Based Tracking (May be Executed in Mobile Device)

The standard approach of a vision based tracking may be divided into four main building blocks: feature detection, feature description, feature matching, and pose estimation. Having a known geometrical model of the real environment or part of the real environment could support standard vision based tracking to determine the pose of a camera relative to the environment.

Further, optical flow from a camera may also be employed to compute camera pose or motion in the environment or support the camera pose estimation.

Feature detection is also referred to as feature extraction. Features are for example, but not limited to, intensities, gradients, edges, lines, segments, corners, descriptive features or any other kind of features, primitives, histograms, polarities or orientations, or their combinations.

To determine the pose of a camera, a current image has to be captured by the camera at the pose to be determined. At first, feature detection is performed for identifying features in the current image. Feature description is the transformation of the detected image region into a typical feature descriptor. A feature descriptor is determined in order to enable the comparison and matching of features. An important task is feature matching. Given a current feature detected in and described from the current image, the goal is to find a feature that corresponds to the same physical 3D or 2D surface in a set of provided features that will be referred to as reference features. The reference features may be obtained from a reference geometrical model of the real environment. The reference geometrical model is obtained based on sensors of the mobile system. The reference features may also be from one of other images captured by the camera (e.g. images captured by the camera at a pose different from the pose where the current image is captured), or from a pre-defined feature list.

Matching the current features with the reference features could be done by determining a respective similarity measure between each respective current feature descriptor and each respective reference feature descriptor. After feature matching, correspondences between features from the current image and reference features are created. The correspondences could be 2D-2D or 2D-3D. Based on the correspondences, camera pose relative to the environment or to the one of other camera poses is determined.

Furthermore, a second geometrical model of the real environment could be generated or extended from the reference geometrical model by triangulation based on feature correspondences of the current image and one of other images captured by the camera. The current image and the one of other images must have an overlapping portion, and then the overlapping portion could be reconstructed based on triangulation. The reconstructed portion may be added to the reference geometrical model.

Figure 5:
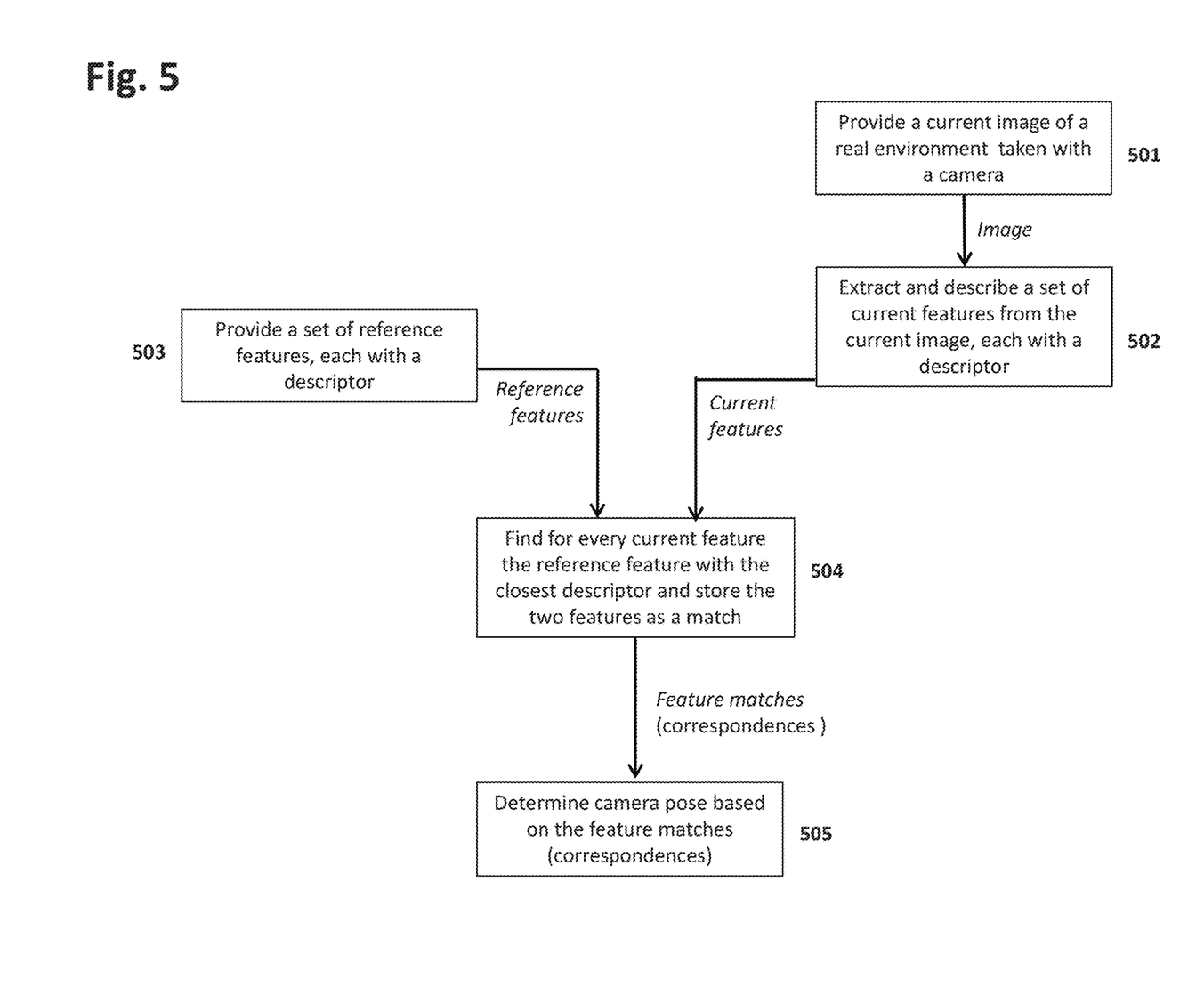
FIG. 5 shows a flow chart of an embodiment of a tracking method based on images of a camera to match a set of current features with a set of reference features.

Referring now to FIG. 5 (in connection with FIG. 2), FIG. 5 shows a flow chart of a standard camera tracking method to match a set of current features with a set of reference features. In step 501, a current image CI of a real environment is provided captured with a camera. The next step 502 then detects and describes features in the current image CI (optional: already selective extraction according to estimated model-feature-positions), where every resulting current feature c has a feature descriptor d(c) and a 2D position in the camera image. A set of reference features r, each with a descriptor d(r) and optionally a (partial) position and/or orientation with respect to the real environment or one of previous camera poses is provided in step 503. The (partial) position may be obtained from a GPS sensor/receiver, IR or RFID triangulation, or by means of localization methods using a broadband or wireless infrastructure. The (partial) orientation may be obtained from a sensor device, such as a compass, an accelerometer, a gyroscope, and/or a gravity sensor. The reference features can be extracted from reference images or geometrical models or other information about the real environment or a part of the environment. Note that the position and/or orientation with respect to the real environment is optional in case of visual search and classification tasks. In step 504, the current features c from step 502 and the reference features r from step 503 are matched. For example, for every current feature the reference feature is searched that has the closest descriptor to the descriptor of the current feature with respect to a certain distance measure. According to step 505, the position and orientation of the camera can be determined based on the feature matches (correspondences). This could support an augmented reality application that integrates spatially registered virtual 3D objects into the camera image.

Data Handover from Mobile System to Mobile Device (May be Executed in Mobile Device and Mobile System)

If environmental data captured by sensors of a mobile system during the mobile system travelling in an environment are available, the environmental data could be transferred to a mobile device of a user (e.g. passenger or driver of the mobile system) who prepares to get off the mobile system. Transferring the data from the mobile system to the mobile device may be via a server computer or based on a point to point communication. A geometrical model of the environment could be reconstructed based on the environmental data received in the mobile device. The user may then use the geometrical model for tracking.

The geometrical model may also be generated in the mobile system based on the environmental data, and then transferred to the mobile device via a server computer or based on a point to point communication.

The geometrical model may also be generated in a server computer based on the environmental data. In this case, the captured environmental data is transferred from the mobile system to the server computer and then the generated geometrical model is transferred from the server computer to the mobile device.

The point to point communication can be via wireless or wire-bound connection, push-based or pull-based, unicast or broadcast communication. The latter enables, e.g., that a pool of mobile devices are equipped with the same data from the mobile system at the same time. These mobile devices, e.g., could be mobile devices of the other passengers or secondary devices of the user. For example, the point to point communication could be Bluetooth based communication or USB cable based communication.

Handing over data (geometrical model or environmental data) from the mobile system, or to the mobile device, could be triggered either manually by the user or triggered automatically. The automatic trigger of the data (e.g. model) transfer can be based on the distance to the destination known to the navigation system, the speed of the mobile system, the state of the engine, the driving direction of the mobile system (e.g. driving backwards), the relative direction of the mobile system to the street (e.g. driving into forward-only parking space or parking lane), distance of another object to the front or rear of the mobile system, open/close state of the driver's door, steering wheel lock, hand brake, open/close state of the trunk, or a combination of the above. The automatic trigger can also be based on the state of the mobile device, e.g. when it is removed from a wired connector or detects an upward motion that is not compatible with the general motion of the mobile system (e.g., in a case when the driver gets off the car). The detection or determination of the conditions that are used to trigger the data (e.g. model) transfer can be executed by the mobile system, the mobile device, or both. The process of the data (model) transfer could be initiated by the mobile system, the mobile device, or the both.

In the described application example, an aspect of the present invention is that tracking the mobile device in the parking lot could be supported by environmental data acquired by the sensors of the mobile system during the mobile system was driven to the parking lot.

As shown in FIG. 4, user 413 is driving the mobile system 411 to a parking lot, i.e. a real environment. A camera 414 (one or multiple sensors of the mobile system) is mounted to the front of the mobile system. While searching for parking space and parking (see FIG. 4, depiction 402), environmental data (e.g. images of parking lot) are captured by camera 414, and a geometrical model of the parking lot is generated based on the environmental data. The geometrical model may be created with a correct metric scale, for example based on odometric and GPS data provided by the mobile system. The correct scale factor may define the true camera pose and the size of the reconstructed geometrical model as they are in the real world.

After parking (see FIG. 4, depiction 405), the geometrical model is transferred to the user's mobile device 408 (or generated at the user's mobile device 408 from transferred environmental data) equipped with a camera (e.g. a smart phone). Then, tracking the mobile device in the parking lot can ideally continue seamlessly based on at least one image captured by the camera of the mobile device 408 (see FIG. 4, depiction 405). In contrast to existing approaches, the present invention provides the user with an initial and up-to-date geometrical model of the environment on his mobile device. This removes the need of the initial step of requiring a constraint camera movement.

Currently, a geometrical model of a real environment, e.g. a city or a building, is often available from a 3D reconstruction process. However, most of these models are not up-to-date due to a frequent development or change of city constructions. Particularly, parking lots usually do not have geometrical models or up-to-date models, as parked cars change from time to time. In this regard, the present invention provides an up-to-date model that would support tracking a camera more accurately.

The mobile system may be a mobile machine that could transport people or cargo. The mobile system could be, for example, but is not limited to, a bicycle, motorcycle, car, truck, or forklift. The mobile system may or may not have an engine.

Acquiring the environmental data that is used to create the first geometrical model can be started at any time or only when certain conditions are met, e.g. when the mobile system is close to the destination known to a navigation system, and/or when the speed of the mobile system is below a certain threshold, etc. The certain condition may also be one of certain states of the mobile system, e.g. speed, the state of engine, state of braking system, the position of gears, light, etc. The certain condition may also be one of states of the mobile device, e.g. the mobile device being inside or outside the mobile system, the distance of the mobile device to the destination, etc.

The environmental data may be acquired according to a position of the mobile system and a pre-defined route containing at least one destination.

In one implementation, the environmental data is acquired or at least part of the acquisition process of the environmental data could start after the mobile system reaches the at least one destination. In another implementation, the environmental data is acquired or at least part of the acquisition process of the environmental data could start if the mobile system is within a distance to the at least one destination. Having the speed of the mobile system, the position of the mobile system, and the at least one destination, it is possible to estimate a time period within which the mobile system would reach the at least one destination. In another implementation, if the time period is below a threshold, the environmental data is acquired or at least part of the acquisition process of the environmental data could start.

Generating the first geometrical model or a part of the first geometrical model may be performed at processor devices of the mobile system, and the first geometrical model is transferred from the mobile system to the mobile device. The first geometrical model may be transferred from the mobile system to the mobile device via a server computer or based on a point to point communication. The first geometrical model or a part of the first geometrical model may also be generated by processor device(s) of the mobile device, after the environmental data is transferred from the mobile system to the mobile device via a server computer or based on a point to point communication.

Generating the first geometrical model or a part of the first geometrical model may be performed by a server computer, and the environmental data is transferred from the mobile system to the server computer. Then, the first geometrical model is transferred from the server computer to the mobile device, e.g. via the mobile system or based on a point to point communication.

The sensor(s) of the mobile system could be any type of sensors that are capable of capturing environmental data which can be used to generate a geometrical model or a part of it. Examples of sensors are, but are not limited to, optical camera, camera based on infrared, optical, ultraviolet, xray and/or gamma spectra, RGB-D camera, depth sensor, time of flight camera, and ultrasonic sensor.

The environmental data may be any type of data that describes at least one visual or geometrical feature of the real environment. The visual or geometrical feature may be one of shape, color, distance, etc. The environmental data could be an optical image of the environment, or a distance between the environment and the mobile system, or an orientation of the mobile system in the environment, or a speed of the mobile system in the real environment.

Generating the first geometrical model could be performed at any time whenever the environmental data or part of the environmental data is available, e.g. online during the acquisition of the environmental data, or offline after the acquisition of the environmental data.

The first geometrical model may have a correct metric scale, which is determined from mobile system-mounted sensors, such as radar, range sensors, or time of flight cameras. The correct metric scale may also be determined from capturing an image of two points that have a known distance between them or a real object with a known physical size in the environment using a camera mounted in the mobile system.

The first geometrical model may also be generated according to a pose of the mobile system relative to the environment. The position of the mobile system relative to the environment may be obtained from GPS. However, GPS is not accurate, especially when the mobile system is inside buildings. There are many different sensors that may be installed in the environment, like cameras (e.g. security camera), and have known positions in the environment. It is possible to perform object recognition or pose estimation based on images of the mobile system captured by the security camera in order to determine the pose of the mobile system relative to the environment.

Furthermore, a vision system (e.g. one or more security cameras) positioned in the real environment may be used to capture environmental data which could be used to create at least part of the first geometrical model.

In another implementation, a vision system (e.g. security cameras) positioned in the real environment may also be used to capture environmental data for creating the first geometrical model without using data acquired by at least one sensor of the mobile system. For example, a user may hold a mobile device comprising a camera and enter a real environment where one or more security cameras are placed. An up-to-date environmental data of the real environment may be captured by the vision system (e.g. the one or more security cameras) during an acquisition process and the first geometrical model may be created based on the captured environmental data. The mobile device may be tracked according to the created first geometrical model and images captured by the camera of the mobile device within a set time period, preferably within 24 hours, after the acquisition process or a part of the acquisition process.

The pose of the mobile system relative to the environment may also be obtained according to specific properties of the mobile system running on roads. For example, the movement of the mobile system may be assumed to be parallel to the ground plane. The orientation of the mobile system may be determined according to a 2D street map.

In one embodiment, only environmental data of places where a user is likely to come by on his route may be acquired and added to the first geometrical model.

In another embodiment, environmental data may be acquired according to navigation data, e.g. routes, starting locations, or destinations. For example, only environmental data along routes may be acquired and thus the first geometrical model may be only for the environment information along the routes. Navigation data may be manually input by the user to the mobile system and/or to the device.

In one embodiment, the generation of the first geometrical model may be based at least in part on mobile system state data acquired in an acquisition process by at least one sensor of a mobile system. For example, at least part of the environmental data for generating the first geometrical model may be acquired by an independent sensor that is not part of the mobile system. The acquired at least part of the environmental data may be used together with mobile system state data acquired by one or more sensors of the mobile system in order to create at least part of the first geometrical model. For example, a camera that is separate from the mobile system held by a passenger sitting in the mobile system may capture images of the real environment, while an odometry and/or speed sensor of the mobile system may be used to acquire odometry or speed data about the mobile system. The images of the real environment and the odometry or speed data may be used together to create at least part of the first geometrical model. This could take an advantage that the camera held by the passenger has a known movement or position relative to the mobile system. The movement could be that the camera is static (no motion) relative to the mobile system. It is also possible that the camera has motion relative to the mobile system. The camera may be tracked in a coordinate system of the mobile system. For example, an image capture device could be mounted in the mobile system and determine a pose of the camera relative to the mobile system. In another example, an image of at least part of the mobile system captured by the camera could be used to determine a pose of the camera relative to the mobile system.

In another embodiment, data acquired by at least one sensor of the mobile system may not be sufficient to create at least part of the first geometrical model. Similarly, data acquired by a camera of the mobile device may also not be sufficient to create at least part of the first geometrical model.

However, at least part of the first geometrical model may be created by using both data acquired by the at least one sensor of the mobile system and by the camera of the mobile device. For example, it may not be possible to create the first geometrical model by using only one image captured by a camera of the mobile system or by using only one image captured by a camera of the mobile device. However, it may be possible to create the first geometrical model by using the image captured by the camera of the mobile system and the image captured by the camera of the mobile device.

Further, it may not be possible to create at least part of the first geometrical model with a correct metric scale by using either data acquired by at least one sensor of the mobile system or data acquired by a camera of the mobile device. However, it may be possible to create at least part of the first geometrical model with a correct metric scale by using, both, data acquired by the at least one sensor of the mobile system and by the camera of the mobile device. As the example mentioned above, it may not be possible to create the first geometrical model by using speed or odometry captured by sensors of the mobile system. It may neither be possible to create the first geometrical model with a metric correct scale by using only images captured by a camera of the mobile device. However, the first geometrical model with a correct metric scale could be created by using the images captured by the camera of the mobile device and the odometry or speed data about the mobile system.

Transferring the first geometrical model to the mobile device may be triggered either manually by a user or triggered automatically. The automatic trigger can be based on the distance to the destination known to the navigation system, the speed of the mobile system, the state of the engine, the direction of the mobile system (e.g. driving backwards), the relative direction of the mobile system to the street (driving into forward-only parking space or parking lane), distance of another object to the front or rear of the mobile system, open/close state of the driver's door, steering wheel lock, hand brake, open/close state of the trunk, or a combination of the above.

The present invention is particularly beneficial for mobile AR and navigation applications running on the device.

The mobile device according to the present invention could be from all kinds of devices that could be carried by users, such as hand-held mobile devices (e.g. mobile phone), head worn glasses or helmets, and wearable devices.

Tracking the mobile device equipped with at least one camera in an environment is to determine the pose of the device, i.e. the position and orientation with respect to the environment, or to determine the motion of the device, i.e. the position and orientation with respect to one of other locations of the device. As the camera has a fixed spatial relationship to the mobile device, tracking the mobile device could be realized based on vision based tracking, e.g. using an image captured by the at least one camera and the first geometrical model to determine the pose of the camera. The pose of the camera relative to the environment could be computed based on correspondences between the geometrical model and the camera image.

The second geometrical model of the environment may be created using the first geometrical model and using at least two images having no depth data or using at least one image having depth data captured by the at least one camera. For this, the camera poses when capturing the at least two images or the at least one image may first be determined. Then, the second geometrical model can be constructed based on triangulation using the at least two images or constructed using the at least one image and the associated depth data.

Using one captured camera image without depth data generates model information of the environment with undetermined metric scale. The model information with undetermined metric scale may be used to estimate camera poses when the camera undergoes a pure rotation.

The first geometrical model or a part of the model may not cover the whole area of the real environment of interest. The second geometrical model may be created by extending the first geometrical model or the part of the first geometrical model to cover more area of the environment.

A standard approach to vision based tracking includes feature extraction, feature description, feature matching, and pose determination.

Features are, for example, intensities, gradients, edges, lines, segments, corners, descriptive features or any other kind of features, primitives, histograms, polarities or orientations.

Tracking the mobile device and/or generating the second geometrical model could also be realized by monocular vision based Simultaneous Localization and Mapping (SLAM). Generating the second geometrical model may also include reconstruction algorithms that do not run simultaneously, but use batch/quasi-offline reconstruction methods.

Monocular vision based SLAM is about moving a single camera in a real environment to determine camera poses relative to the real environment and create a model of the real environment. SLAM is often employed for tracking when at least part of the environment has an unknown geometrical model.

The pose of a camera in a real environment describes the position and orientation with respect to the environment or a part of the environment. In 3D space, the position is defined by three parameters, e.g. displacements along three orthogonal axes, and the orientation may be defined by three Euler angle parameters. The orientation may also be represented in other math formulas, e.g. axis angle and quaternions. It is always possible to convert the math representations of the rotation to each other. The pose in the present invention could be defined by at least one of the inherent six parameters of the position and orientation in three dimensional spaces.

The proposed invention can be easily applied to any camera mounted to a mobile device providing an image format (color or gray scale). It is not restricted to capture systems providing color images in the RGB format. It can also be applied to any other color format and also to monochrome images for example to cameras providing images in grayscale format.

The real environment could be any real scene in real world, such as a nature scene, an indoor environment scene, or a city scene. A real environment includes one or more real objects. A real object, such as a place, a building, a tree, or a mountain, locates and occupies an area in the real environment.

A geometrical model (also referred to as model or map) of an environment at least describes the depth information of the environment. The model further may include at least one of the following attributes, but is not limited to: shape, symmetry, planarity, geometrical size, color, texture and density. The geometrical model may include various features.

The geometrical model may further comprise information on the texture, color, and/or their combinations (i.e. material) of (parts of) the real environment. A very common representation of the first model combines 3D points that provide a sparse spatial description of the geometry. The geometrical model may further have associated feature descriptors that describe the texture of features (as part of the material) in an image patch around the 3D points. The feature descriptors are a mathematical representation describing local features in images or image patches, such as SIFT (Scale-invariant feature transform), SURF (Speeded Up Robust Features), and LESH (Local Energy based Shape Histogram). The features are such as but not limited to intensities, gradients, edges, lines, segments, corners, descriptive features or any other kind of features, primitives, histograms, polarities or orientations.

The geometrical model can further, for example, be represented as a model comprising 3D vertices and polygonal faces and/or edges spanned by these vertices. Edges and faces of the model may also be represented as splines or NURBS surfaces. The geometrical model can also be represented by a set of 3D points. The points might carry additional information on their color or intensity.

Throughout this document it is described that images are captured and image information associated with an image is provided or received. It is known to the skilled person that this may include providing or receiving any processed or non-processed information (version) of an image, part of an image and/or features of an image which allows for pose estimation (tracking) or reconstruction. The invention does not require providing or receiving any raw original image data. Processing thereby includes any one of compression (e.g. JPEG, PNG, ZIP), encryption (e.g. RSA encryption, Schnorr signature, El-Gamal encryption, PGP), conversion to another color space or grayscale, cropping or scaling the image or conversion into a sparse representation based on feature descriptors, extraction, and their combinations. All these image processing methods can optionally be performed and are covered by the terminology of image information associated with an image.

The invention claimed is:

1. A method comprising:
    determining that a vehicle has reached a first threshold distance from a predefined destination within an environment while the vehicle is moving toward the predefined destination, wherein a mobile device is located within the vehicle while the vehicle is moving;
    in accordance with determining that the vehicle has reached the first threshold distance from the predefined destination:
    acquiring environmental data from one or more sensors of the vehicle for the environment, and
    generating a reference geometric model of the environment based on the acquired environmental data; and
    determining that a trigger condition is satisfied based on a state of the vehicle, wherein the trigger condition comprises a determination that the vehicle has reached a second threshold distance of the predetermined destination; and
    in accordance with detecting that the trigger condition is satisfied, transmitting the reference geometric model of the environment to the mobile device.

2. The method of claim 1, wherein the reference geometric model is further generated based on vehicle status information associated with the acquired environmental data.

3. The method of claim 2, wherein the vehicle status information comprises at least one of a speed of the vehicle or a steering direction of the vehicle.

4. The method of claim 1, wherein the one or more sensors of the vehicle comprises at least two vehicle cameras, with a known spatial relationship between the at least two vehicle cameras.

5. The method of claim 1, wherein the trigger condition further comprises a predetermined vehicle state.

6. The method of claim 1, wherein the reference geometrical geometric model is generated using a motion of the vehicle that is more constrained that motion of the mobile device.

7. A non-transitory computer readable medium comprising computer readable code executable by one or more processors to:
    determine that a vehicle has reached a first threshold distance from a predefined destination within an environment while the vehicle is moving toward the predefined destination, wherein a mobile device is located within the vehicle while the vehicle is moving;
    in accordance with determining that the vehicle has reached the first threshold distance from the predefined destination:
    acquire environmental data from one or more sensors of the vehicle for the environment, and
    generate a reference geometric model of the environment based on the acquired environmental data; and
    determine that a trigger condition is satisfied based on a state of the vehicle, wherein the trigger condition comprises a determination that the vehicle has reached a second threshold distance of the predetermined destination; and
    in accordance with detecting that the trigger condition is satisfied, transmit the reference geometric model of the environment to the mobile device.

8. The non-transitory computer readable medium of claim 7, wherein the reference geometric model is further generated based on vehicle status information associated with the acquired environmental data.

9. The non-transitory computer readable medium of claim 8, wherein the vehicle status information comprises at least one of a speed of the vehicle or a steering direction of the vehicle.

10. The non-transitory computer readable medium of claim 7, wherein the one or more sensors of the vehicle comprises at least two vehicle cameras, with a known spatial relationship between the at least two vehicle cameras.

11. The non-transitory computer readable medium of claim 7, wherein the trigger condition further comprises a predetermined vehicle state.

12. The non-transitory computer readable medium of claim 7, wherein the reference geometric model is generated using a motion of the vehicle that is more constrained that motion of the mobile device.

13. A system comprising:
    one or more processors; and
    one or more computer readable media comprising computer readable code executable by the one or more processors to:
    determine that a vehicle has reached a first threshold distance from a predefined destination within an environment while the vehicle is moving toward the predefined destination, wherein a mobile device is located within the vehicle while the vehicle is moving;
    in accordance with determining that the vehicle has reached the first threshold distance from the predefined destination:
    acquire environmental data from one or more sensors of the vehicle for the environment, and generate a reference geometric model of the environment based on the acquired environmental data; and determine that a trigger condition is satisfied based on a state of the vehicle; and in accordance with detecting that the trigger condition is satisfied, transmit the reference geometric model of the environment to the mobile device, wherein the trigger condition comprises a determination that the vehicle has reached a second threshold distance of the predetermined destination.

14. The system of claim 13, wherein the reference geometric model is further generated based on vehicle status information associated with the acquired environmental data.

15. The system of claim 14, wherein the vehicle status information comprises at least one of a speed of the vehicle or a steering direction of the vehicle.

16. The system of claim 13, wherein the one or more sensors of the vehicle comprises at least two vehicle cameras, with a known spatial relationship between the at least two vehicle cameras.

17. The system of claim 13, wherein the trigger condition further comprises a predetermined vehicle state.

* * * * *